US010691772B2

(12) United States Patent
Greathouse

(10) Patent No.: US 10,691,772 B2
(45) Date of Patent: Jun. 23, 2020

(54) HIGH-PERFORMANCE SPARSE TRIANGULAR SOLVE ON GRAPHICS PROCESSING UNITS

(71) Applicant: Advanced Micro Devices, Inc., Santa Clara, CA (US)

(72) Inventor: Joseph Lee Greathouse, Austin, TX (US)

(73) Assignee: Advanced Micro Devices, Inc., Santa Clara, CA (US)

(*) Notice: Subject to any disclaimer, the term of this patent is extended or adjusted under 35 U.S.C. 154(b) by 0 days.

(21) Appl. No.: 15/958,265

(22) Filed: Apr. 20, 2018

(65) Prior Publication Data
US 2019/0325005 A1    Oct. 24, 2019

(51) Int. Cl.
*G06F 17/16* (2006.01)
*G06F 9/48* (2006.01)

(52) U.S. Cl.
CPC .............. *G06F 17/16* (2013.01); *G06F 9/48* (2013.01)

(58) Field of Classification Search
None
See application file for complete search history.

(56) References Cited

U.S. PATENT DOCUMENTS

| | | | |
|---|---|---|---|
| 6,694,343 B2 * | 2/2004 | Forrest | G06F 17/12 708/446 |
| 2002/0138537 A1 * | 9/2002 | Forrest | G06F 17/12 708/620 |
| 2007/0198621 A1 * | 8/2007 | Lumsdaine | G06F 17/16 708/200 |
| 2011/0307685 A1 * | 12/2011 | Song | G06F 17/10 712/16 |
| 2015/0326245 A1 * | 11/2015 | Li | H03M 7/30 707/693 |
| 2019/0042542 A1 * | 2/2019 | Narayanamoorthy | G06F 17/16 |
| 2019/0325005 A1 * | 10/2019 | Greathouse | G06F 9/48 |
| 2020/0034405 A1 * | 1/2020 | Hamidouche | G06F 17/16 |

OTHER PUBLICATIONS

D. Erguiz, E. Dufrechou, P. Ezzatti, "Assessing Sparse Triangular Linear System Solvers on GPUs". Published in th:, Proc. of the Workshop on Applications for Multi-Core Architectures (WAMCA), 2017.

E. Anderson, Y. Saad, "Solving Sparse Triangular Linear Systems on Parallel Computers". Published in the Int'l J. of High Speed Computing, 1(1), 73-95, May 1989.

(Continued)

*Primary Examiner* — David H Malzahn
(74) *Attorney, Agent, or Firm* — Liang & Liang, PC

(57) ABSTRACT

A method includes storing a sparse triangular matrix as a compressed sparse row (CSR) dataset. For each factor of a plurality of factors in a first vector, a value of the factor is calculated by identifying for the factor a set of one or more antecedent factors in the first vector, where the value of the factor is dependent on each of the one or more antecedent factors. In response to a completion array indicating that all of the one or more antecedent factor values are solved, the value of the factor is calculated based on one or more elements in a row of the matrix and a product value corresponding to the row. In the completion array, a first completion flag for the factor is asserted, indicating that the factor is solved.

22 Claims, 11 Drawing Sheets

(56) References Cited

OTHER PUBLICATIONS

H. Wang, W. Liu, K. Hou, W.C. Feng, "Parallel Transposition of Sparse Data Structures". Published in the Proc. of the Int'l Conf. on Supercomputing (ICS), 2016.

J. H. Saltz, "Aggregation Methods for Solving Sparse Triangular Systems on Multiprocessors". Published in SIAM J. on Scientific and Statistical Computing, 11(1), 123-144, Jan. 1990.

J. Park, M. Smelyanskiy, N. Sundaram, P. Dubey, "Sparsifying Synchronization for High-Performance Shared-Memory Sparse Triangular Solve". Published in the Proc. of the Intl Conf. on Supercomputing (ISC), 2014.

M. Naumov, "On the Parallel Solution of Sparse Triangular Linear Systems". Presented at GPU Technology Conference, 2012.

M. Naumov, "Parallel Solution of Sparse Triangular Linear Systems in the Preconditioned Iterative Methods on the GPU". NVIDIA Technology Report NVR-2011-001, Jun. 2011.

W. Liu, A. Li, J. Hogg, I. S. Duff, B. Vinter, "A Synchronization-Free Algorithm for Parallel Sparse Triangular Solves". Published in the Proc. of the Int'l European Conf. on Parallel and Distributed Computing (EuroPar), 2016.

Dufrechou, E., & Ezzatti, P. (Mar. 2018). Solving sparse triangular linear systems in modern GPUs: a synchronization-free algorithm. In 2018 26th Euromicro International Conference on Parallel, Distributed and Network-based Processing (PDP) (pp. 196-203). IEEE.

International Search Report and Written Opinion of the International Searching Authority, Application No. PCT/US2019/014475 dated Apr. 9, 2019.

Liu, W., Li, A., Hogg, J. D., Duff, I. S., & Vinter, B. (2017). Fast synchronization-free algorithms for parallel sparse triangular solves with multiple right-hand sides. Concurrency and Computation: Practice and Experience, 29(21), e4244.

\* cited by examiner

```
   values: [a, b, c, d, e, f, g, h, i, j]
  columns: [0, 0, 1, 0, 2, 0, 3, 1, 3, 4]
 row_ptrs: [0, 1, 3, 5, 7, 10]
```
CSR dataset 321

```
completion: [0, 0, 0, 0, 0]
```
completion array 323

HIGH-PERFORMANCE SPARSE TRIANGULAR SOLVE ON GRAPHICS PROCESSING UNITS

BACKGROUND

A triangular matrix is a type of square matrix that has only zero elements above or below the main diagonal of the matrix. A lower triangular matrix has only zero elements above the main diagonal, such that any nonzero elements in the matrix are in the lower triangle, on or below the main diagonal. An upper triangular matrix has only zero elements below the main diagonal, such that any nonzero elements in the matrix are in the upper triangle, on or above the main diagonal. A triangular matrix can be used to represent a system of equations in the field of linear algebra.

A sparse triangular matrix is a triangular matrix that has a substantial number of zero elements in the populated triangle; for example, a sparse lower triangular matrix has one or more zero values in its lower triangle. A sparse triangular solve (SpTS) is process for solving for the vector x in the equation Ax=y, where A is a sparse triangular matrix with N rows and N columns, x is a vector with N unknown values, and y is a vector of N known values. If the only non-zero values in the matrix A are on the main diagonal and on one side of that diagonal, it is possible to solve for the vector x using substitution. Solving for a vector entry $x[n]$ relies on having solved all previous vector entries (e.g., $x[0]$-$x[n-1]$) in the case of forward substitution in a lower triangular matrix. However, if the matrix is sparse, some of the triangular matrix values are also zero and it is possible to solve multiple rows in parallel, on parallel processors.

BRIEF DESCRIPTION OF THE DRAWINGS

The present disclosure is illustrated by way of example, and not by way of limitation, in the figures of the accompanying drawings.

DETAILED DESCRIPTION

Figure 1:
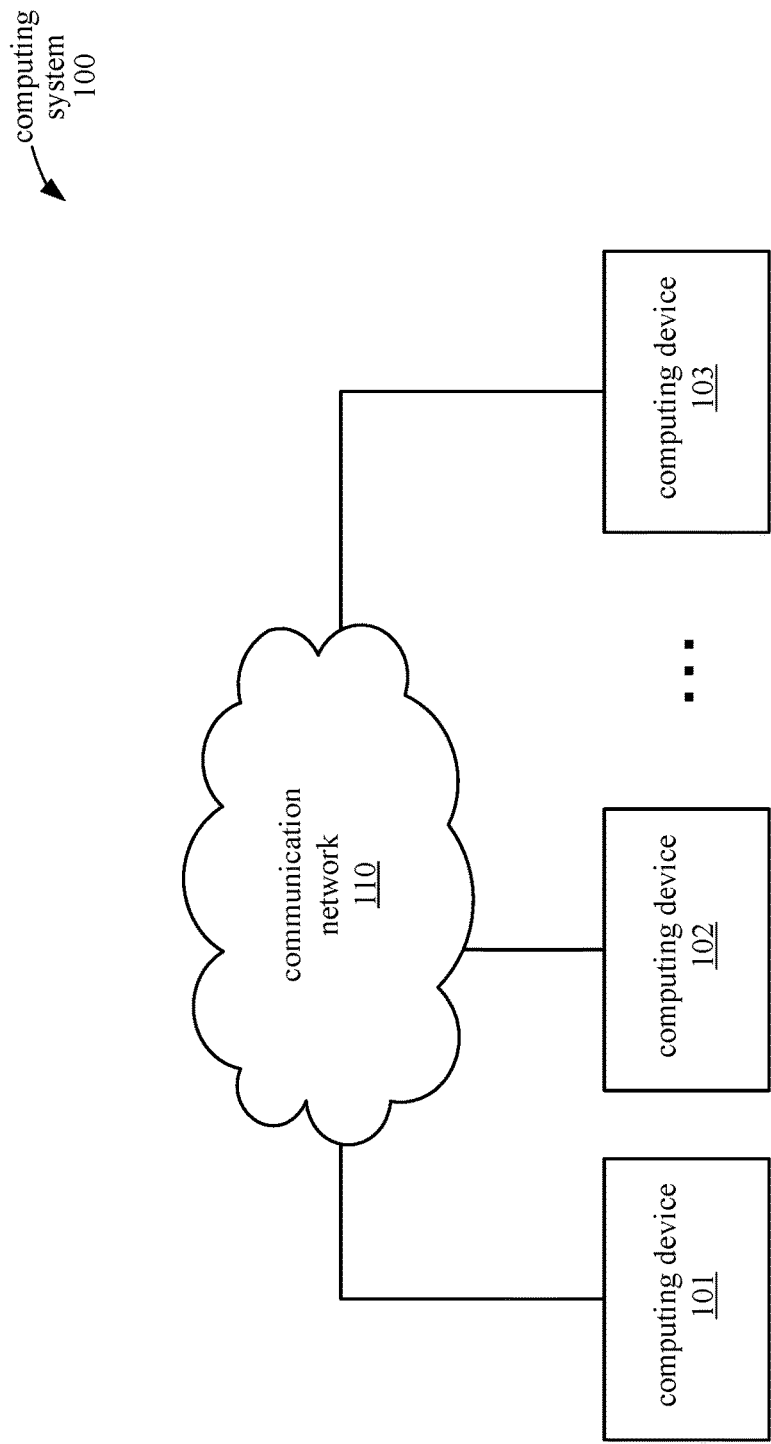
FIG. 1 illustrates an embodiment of a parallel computing system for performing a sparse triangular solve (SpTS), according to an embodiment.

The following description sets forth numerous specific details such as examples of specific systems, components, methods, and so forth, in order to provide a good understanding of the embodiments. It will be apparent to one skilled in the art, however, that at least some embodiments may be practiced without these specific details. In other instances, well-known components or methods are not described in detail or are presented in a simple block diagram format in order to avoid unnecessarily obscuring the embodiments. Thus, the specific details set forth are merely exemplary. Particular implementations may vary from these exemplary details and still be contemplated to be within the scope of the embodiments.

A sparse triangular solve (SpTS) attempts to solve for unknown values in the vector x in the equation Ax=y, where A is a sparse triangular matrix and where y is a vector of known values. Solving rows in the sparse triangular matrix in parallel results in a series of data dependencies; the solution of each factor $x[n]$ in the vector x depends on the previous factors $x[0]$-$x[n-1]$ being solved. The solution is divisible into a series of levels, where factors in the same level do not depend on each other either directly or transitively and are thus solvable in parallel with each other. One of the primary difficulties of quickly performing a parallel SpTS is finding this data dependency graph for any particular input matrix, particularly when the input matrix contains thousands or millions of rows and columns. Accordingly, sparse triangular solves can still perform poorly on highly parallel architectures, such as graphics processing unit (GPU) based parallel computing systems. A parallel computing system can determine when to start solving for a particular factor based on a dependency graph determined before starting the computation, or by communicating between parallel workers when previously calculated results are available.

One approach for performing a SpTS on a parallel computing system includes first analyzing the input matrix to determine which rows and factors can be solved in parallel, then launching a new kernel for each level that includes a thread for solving each of the rows in the level in parallel. However, dividing the SpTS into analysis and solution phases results in a more cumbersome application programming interface (API) in which users additionally invoke the analysis (an implementation-level detail) before they can obtain the desired solution. Furthermore, the time taken to perform the analysis can exceed the time taken for calculating the solutions. Depending on the analyses performed, the analysis can take up to thousands of times longer than the solution phase. If the matrix is not used repeatedly, the time spent performing the analysis may not be amortized.

In some cases, a factor in a given level may depend on a subset of factors in the previous level that have already been solved; thus, solving of the factor should be able to proceed. However, solving of the factor does not proceed while other factors remaining unsolved in the previous level are preventing the previous level from completing. Thus, some parallelism can be lost when dividing SpTS calculations into levels.

In one approach that does not require a separate analysis stage, a SpTS can be performed that dynamically manages the parallel workers during a solution stage by operating on a sparse triangular matrix that is stored according to a Compressed Sparse Column (CSC) format. However, many applications store sparse triangular matrices in a Compressed Sparse Row (CSR) format, and transposing a CSR dataset to a CSC format can consume substantial time and memory resources.

In one embodiment, a parallel computing system can perform a SpTS on a matrix that is stored in a CSR format by updating a completion array that indicates when factors of the vector x have been solved and are available for use in subsequent calculations. A kernel launched by the computing system executes a thread for calculating each factor x[n] in vector x using the elements in the corresponding row n of the matrix. In each thread, a spin loop is executed to repeatedly monitor a completion flag in the completion array to determine whether the antecedent factors (representing input variables for row n) on which the factor x[n] depends have been solved. When an antecedent factor has been solved, it is used to calculate a part of the value of factor x[n].

To reduce memory contention caused by spin looping on the values in the completion array, if the number of iterations of a spin loop or an amount of time spent spin looping exceeds a limit, the thread launches a dependent child kernel that is enqueued to start after completion of the current kernel. After the remaining threads have completed (i.e., more factors have been solved), the dependent child kernel starts a new thread to resume spin looping on the same value in the completion array.

This high-performance SpTS mechanism thus allows a parallel computing system to perform a SpTS on sparse triangular matrix stored in the CSR format without performing an expensive transpose operation for converting it to another format such as CSC. Because it does not group rows and their corresponding factors into levels, the mechanism does not create false dependencies and is thus able to find more dynamic parallelism in performing the SpTS. The high-performance SpTS mechanism does not require a separate analysis stage; each parallel worker begins solving a row to calculate a value for its corresponding factor when the antecedent factors are already known or become available from solving previous rows. A mechanism that allows spin loops to time-out and resume later by launching a child kernel reduces memory contention due to the spin looping on multiple completion flags in the completion array. In one embodiment, this high-performance SpTS mechanism performs thousands of times faster, in some cases, than a SpTS mechanism that performs the analysis and solution in separate stages.

FIG. 1 illustrates an embodiment of a parallel computing system 100. Computing system 100 includes multiple computing devices 101-103 that are connected to each other via a communication network 110. Each of the computing devices 101-103 has processing and memory storage capabilities. In one embodiment, the computing system 100 is contained within a single physical enclosure, and the communication network 110 is a bus or system interconnect connecting the computing devices 101-103 within the enclosure. For example, the computing devices 101-103 can include processing units such as GPUs, central processing units (CPUs), field programmable gate arrays (FPGAs), etc. on the same board or on separate carrier boards that are connected to each other via a backplane. In one embodiment, the components in the computing system 100 are contained in separate physical enclosures and are geographically distributed. For example, the computing devices 101-103 can represent individual servers, personal computers, mobile devices, etc. that are connected to each other via a wide-area network (WAN) such as the Internet, a local-area network (LAN), wireless network, or other communication network 110. In one embodiment, the computing devices 101-103 represent the same type or similar types of devices; alternatively, the computing devices 101-103 are different types of devices.

Figure 2:
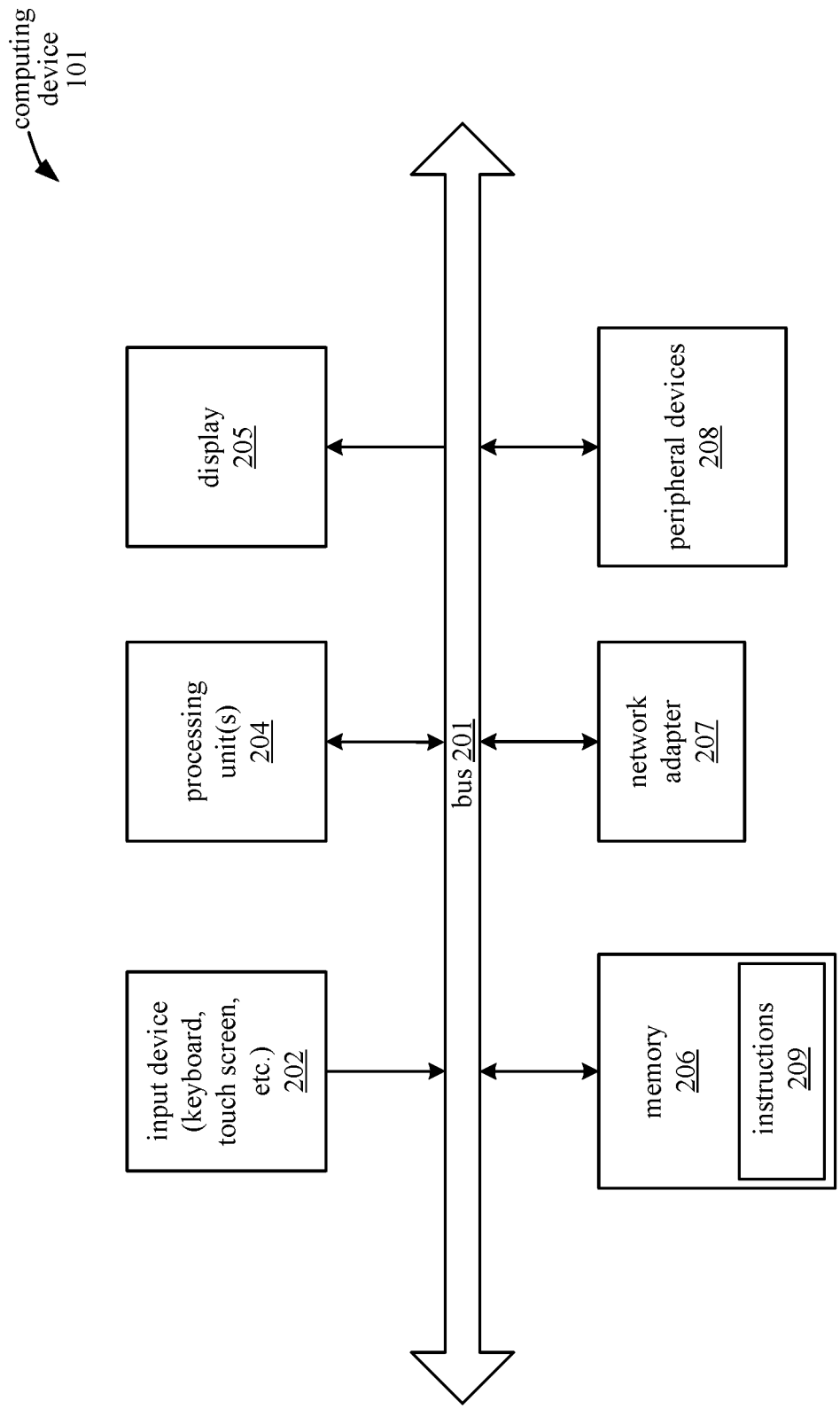
FIG. 2 illustrates a computing device, according to an embodiment.

FIG. 2 illustrates an embodiment of a computing device 101 in which a high-performance parallel SpTS mechanism is implemented. In general, the computing device 101 is embodied as any of a number of different types of devices, including but not limited to a laptop or desktop computer, mobile device, server, etc. The computing device 101 includes a number of components 202-208 that communicate with each other through a bus 201. In computing device 101, each of the components 202-208 is capable of communicating with any of the other components 202-208 either directly through the bus 201, or via one or more of the other components 202-208. The components 201-208 in computing device 101 are contained within a single physical enclosure, such as a laptop or desktop chassis, or a mobile phone casing. In alternative embodiments, some of the components of computing device 101 are embodied as peripheral devices such that the entire computing device 101 does not reside within a single physical enclosure.

The computing device 101 also includes user interface devices for receiving information from or providing information to a user. Specifically, the computing device 101 includes an input device 202, such as a keyboard, mouse, touch-screen, or other device for receiving information from the user. The computing device 101 displays information to the user via a display 205, such as a monitor, light-emitting diode (LED) display, liquid crystal display, or other output device.

Computing device 101 additionally includes a network adapter 207 for transmitting and receiving data over a wired or wireless network. Computing device 101 also includes one or more peripheral devices 208. The peripheral devices 208 may include mass storage devices, location detection devices, sensors, input devices, or other types of devices used by the computing device 101.

Computing device 101 includes one or more processing units 204, which in the case of multiple processing units 204 are capable of operating in parallel. The processing unit(s) 204 are configured to receive and execute instructions 209 that are stored in the memory subsystem 206. In one embodiment, each of the processing unit(s) 204 includes multiple processing cores that reside on a common integrated circuit substrate. Memory subsystem 206 includes memory devices used by the computing device 101, such as random-access memory (RAM) modules, read-only memory (ROM) modules, hard disks, and other non-transitory computer-readable media.

Some embodiments of computing device 101 may include fewer or more components than the embodiment as illustrated in FIG. 2. For example, certain embodiments are implemented without any display 205 or input devices 202. Other embodiments have more than one of a particular component; for example, an embodiment of computing device 101 could have multiple buses 201, network adapters 207, memory devices 206, etc.

Figure 3:
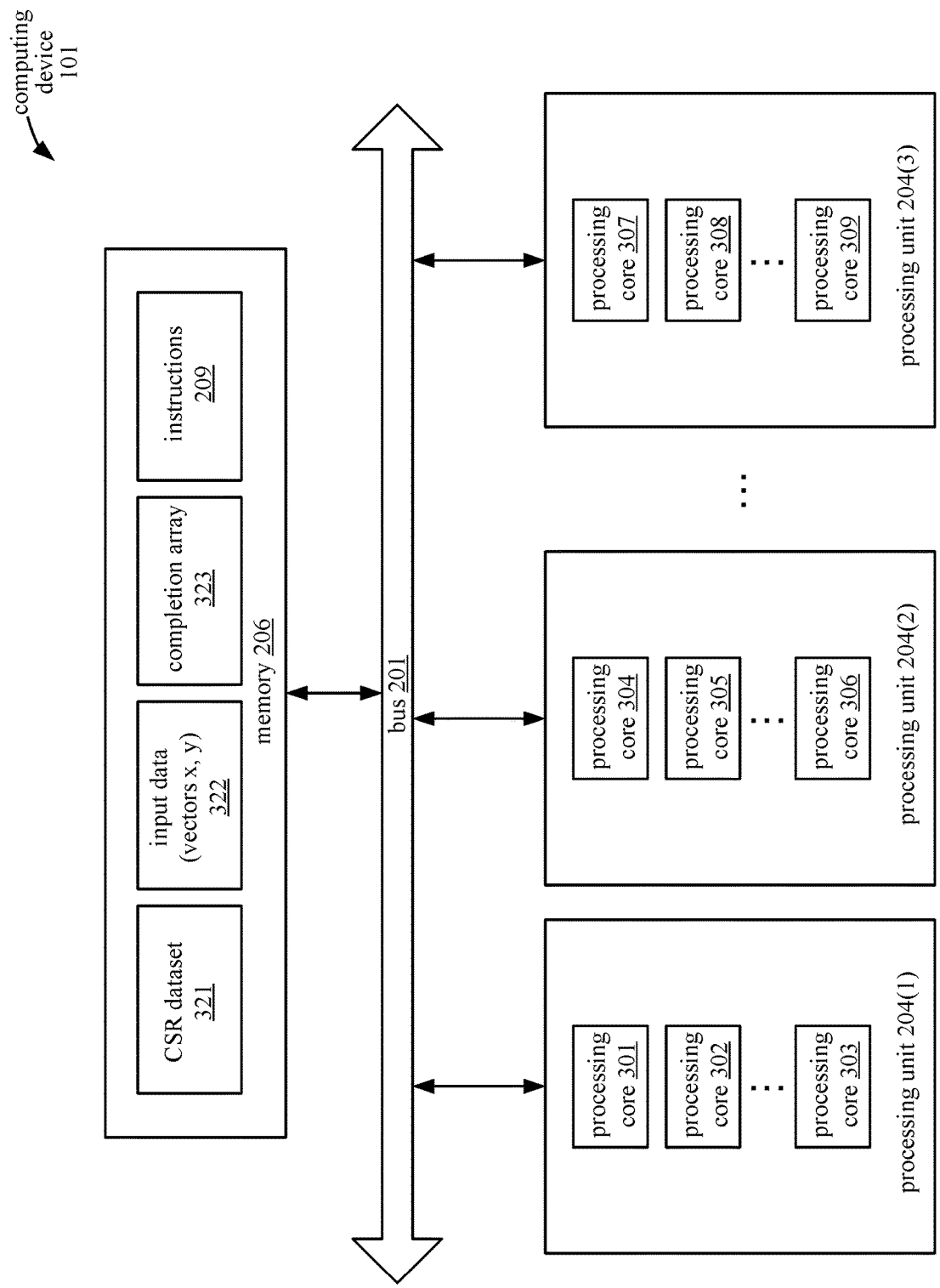
FIG. 3 illustrates multiple processing units and memory in a computing device, according to an embodiment.

FIG. 3 illustrates a block diagram including selected components of the computing device 101, according to an embodiment. FIG. 3 illustrates the processing units 204, which are each connected to the memory 206 via bus 201. While FIG. 3 illustrates one of the computing devices 101, other computing devices (e.g., 102-103) in the computing system 100 include similar components.

In one embodiment, each of the processing units 204 is a GPU, CPU, FPGA, or other processing device, and is located on a separate integrated circuit die from other processing units in the set of processing units 204. Each of the processing units 204 includes a set of processing cores on a single integrated circuit die. Processing unit 204(1)

includes processing cores 301-303, processing unit 204(2) includes processing cores 304-306, and processing unit 204(3) includes processing cores 307-309. Each of the processing cores is configured to execute a thread in a computer program, as directed by the instructions 209. The processing cores 301-309 are capable of executing instructions independently from each other, and are thus capable of executing parallel threads in a SpTS process, where each of the parallel threads is executed in one of the processing cores 301-309 and calculates a value for one of the factors in the vector x.

In addition to a set of instructions 209 for performing the high-performance SpTS of the equation Ax=y, the memory 206 also stores the sparse triangular matrix A in the form of a CSR dataset 321 and input data 322, which includes the vector x of unknown factors to be solved and the vector y of known product values. The memory 206 also stores a completion array 323 that includes a completion flag for each of the factors in the vector x, with each completion flag indicating whether its corresponding factor has been solved. In one embodiment, the information in the memory 206 is stored on a single memory device or subsystem in the computing device 101. In alternative embodiments, the information is distributed across multiple memory devices in the same computing device 101 or in multiple computing devices (e.g., 101-103). Accordingly, a memory system for the broader computing system 100 can include memory devices distributed across multiple computing devices 101-103.

Figure 4A:
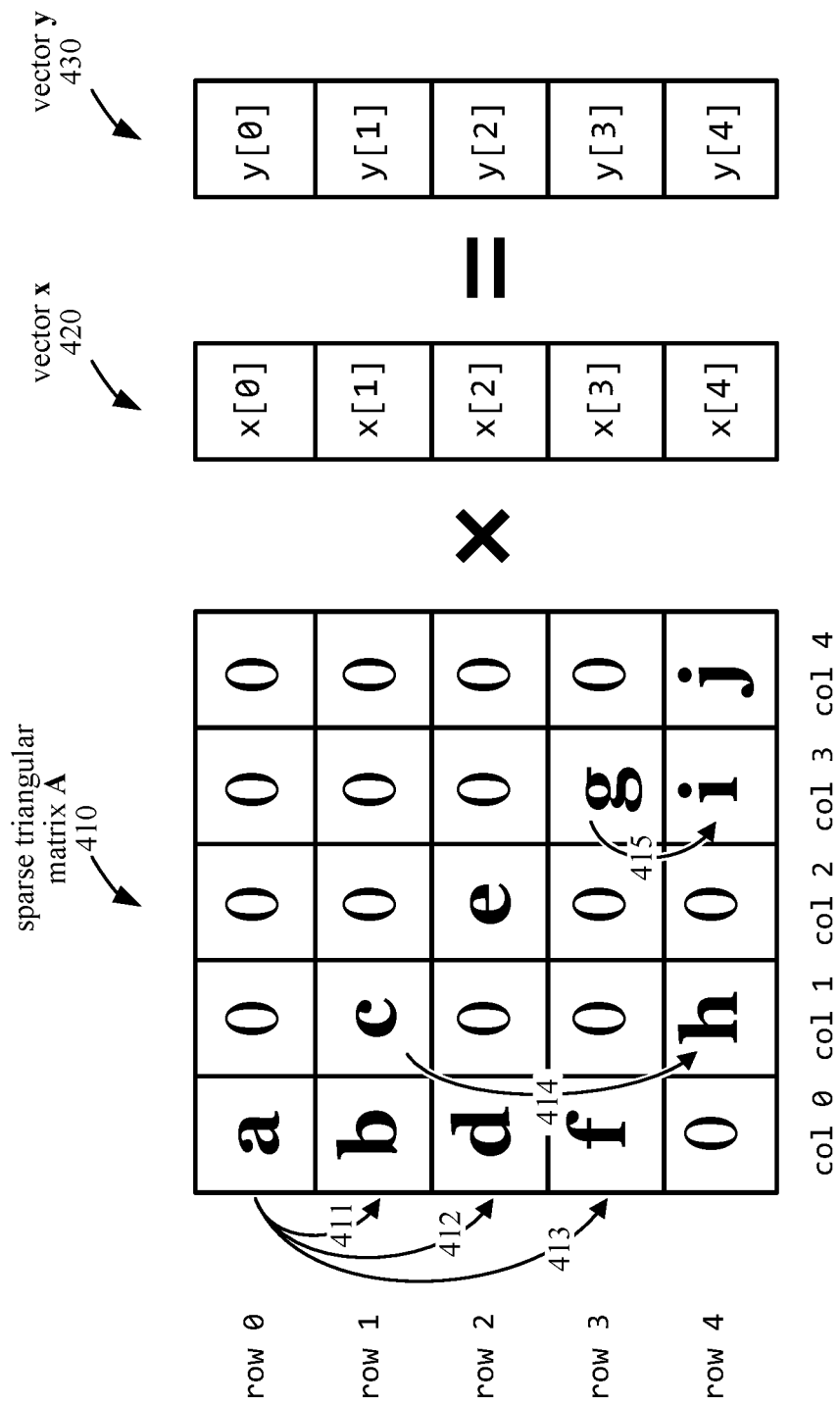
FIG. 4A illustrates a matrix multiplication of a sparse triangular matrix and a vector, according to an embodiment.

FIG. 4A illustrates the multiplication of a sparse triangular matrix 410 with a vector x 420 that results in a product vector y 430 (i.e., Ax=y), according to an embodiment. The matrix A 410 is used as an input for a SpTS, and is a lower triangular matrix that includes 10 non-zero elements. The main diagonal of the matrix A 410 includes the elements a, c, e, g, and j. Since matrix A 410 is a lower triangular matrix, it can be solved with forward-substitution. This means that some rows will be solved using the results of previously solved higher-up rows as input. Accordingly, the arrows 411-415 represent these dependencies in the forward-substitution process. For example, solving the factors x[1], x[2], and x[3] corresponding to respective rows 1, 2, and 3 depends on the factor x[0] associated with row 0 being solved. These dependencies are indicated by the arrows 411, 412, and 413, respectively. For example, the dependency arrow 411 indicates that calculating the value of the term bx[0] from row 1 depends on solving for x[0] using the term ax[0] in row 0. Dependency arrows 414 and 415 indicate that solving factor x[4] via row 4 depends on solving the x[1] and x[3] factors, respectively, which correspond to the non-zero elements c and g. The solved x[1] and x[3] factors are used to calculate the terms hx[1] and ix[3] when solving for the factor x[4]. While the high-performance SpTS mechanism is described herein as being performed for solving a lower triangular matrix, the mechanism can be similarly used to perform backwards-substitution to solve an upper triangular matrix.

Figures 4B, 4C:
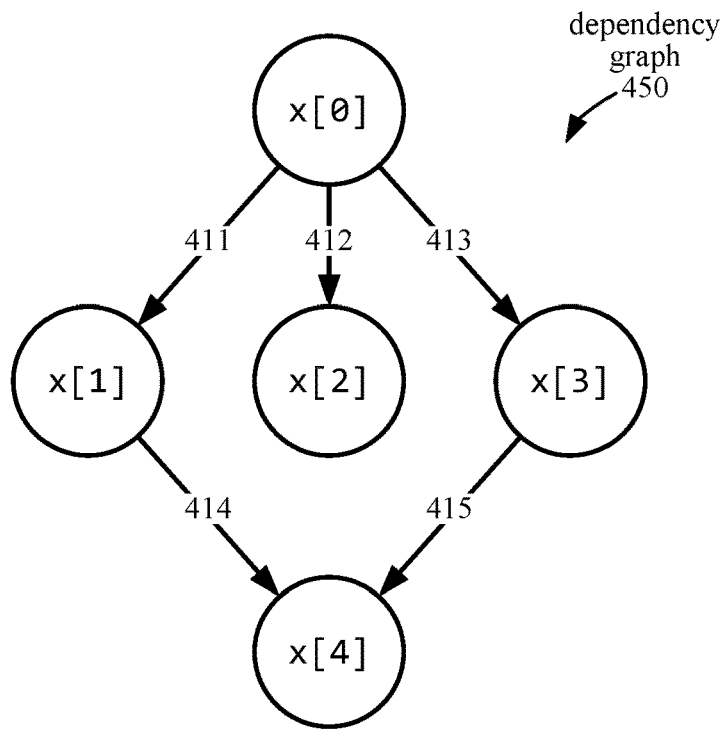
FIG. 4B illustrates a dependency graph for a SpTS, according to an embodiment.
FIG. 4C illustrates a compressed sparse row (CSR) dataset and a completion array, according to an embodiment.

FIG. 4B illustrates a dependency graph 450 for performing a SpTS of the matrix A 410. Each of the nodes in the graph represents one of the factors in vector x to be solved. The dependencies 411-415 in FIG. 4B correspond respectively to the similarly numbered dependencies 411-415 on FIG. 4A. The calculation of each of the factors x[0]-x[4] is performed by a separate thread, where each of the separate threads is executed in a separate processing core (e.g., one of the processing cores 301-309).

In the dependency graph 450, the calculation of a value for factor x[0] has no dependencies and is calculated first without waiting for any other factors to be solved. Solving of each of the factors x[1], x[2], and x[3] is dependent on x[0] via dependencies 411, 412, and 413, respectively; therefore, these calculations are started when x[0] is solved and becomes available. The calculations executed in the respective separate threads for solving x[1], x[2], and x[3] are performed at least partially in parallel, but can take different amounts of time to finish calculating their respective factors. The solving of x[4] is dependent on x[1] and x[3] via dependencies 414 and 415, respectively. Thus, the full calculation of x[4] is performed when both of x[1] and x[3] are available. In one embodiment, each of multiple threads solves for one of the factors x[0]-x[4]. In alternative embodiments, a parallel workgroup including multiple threads solves one factor, a single thread solves for multiple factors, or multiple threads solve for multiple factors in the vector x 420.

FIG. 4C illustrates a Compressed Sparse Row (CSR) dataset 321 that represents the sparse triangular matrix A 410, according to an embodiment. The CSR dataset 321 includes three arrays: a values array (values[ ]), a columns array (columns[ ]), and a row pointers array (row_ptrs[ ]). The values array stores the non-zero elements of the matrix A 410. The elements are stored in order from left to right (column 0 to column 4 within each row) and from top to bottom (row 0 to row 4) in the matrix. The columns array identifies, for each of the elements in the values array, a column of the matrix in which the element is located. The column array has the same number of entries as the values array; each element of the column array identifies the column for a corresponding element in the values array having the same array index. The row pointers array identifies which elements are in each row of the matrix. Specifically, each value in the row pointers array is an index pointing into the values array and the columns array at the first value in each row. The final value in the row pointers array is one more than the highest index in the values array or columns array.

According to one approach for performing a SpTS for a matrix stored in the CSR format, a thread 0 for solving x[0] notifies the dependent threads 1, 2, and 3 (for solving x[1], x[2], and x[3], respectively) when x[0] is solved. However, when the CSR format is used, such notification would entail walking the columns array to find all entries containing '0', which indicates that the row has a non-zero value in column 0, and therefore has a data dependency on x[0]. After finding a '0' entry in the columns array, thread 0 would also determine which dependent thread to wake by performing a search of the row pointers array to determine which two indices in the row pointers array the '0' entry from the columns array lies between. The walking of the columns array and searching of the row pointers array is computationally expensive and results in an infeasible slowdown for a high-performance SpTS.

FIG. 4C additionally illustrates a completion array 323 that is used to avoid the computationally expensive walking of the columns array and searching of the row pointers array, according to an embodiment. Instead of each completed thread waking its dependent threads, each of the waiting dependent threads checks the completion array 323 to determine whether its antecedent factors have been solved. The completion array 323 stores a completion flag for each of the factors in the vector x 420 (and thus for each of the rows in the matrix A 410). Each factor in the vector x 420 corresponds to a flag in the completion array having the same index (i.e., x[n] corresponds to completion[n]). Before starting the SpTS, all of the flags in the completion array are initialized to '0', indicating that none of the factors have yet been solved. Whenever a thread finishes writing a solved value for one of the factors in the vector x 420, the thread also asserts the corresponding completion flag in the completion array 323 to indicate that the solved value is available for use in subsequent calculations. In one embodiment, the completion flag is deasserted when its value is zero, and is asserted when its value is a non-zero value.

Figure 5:
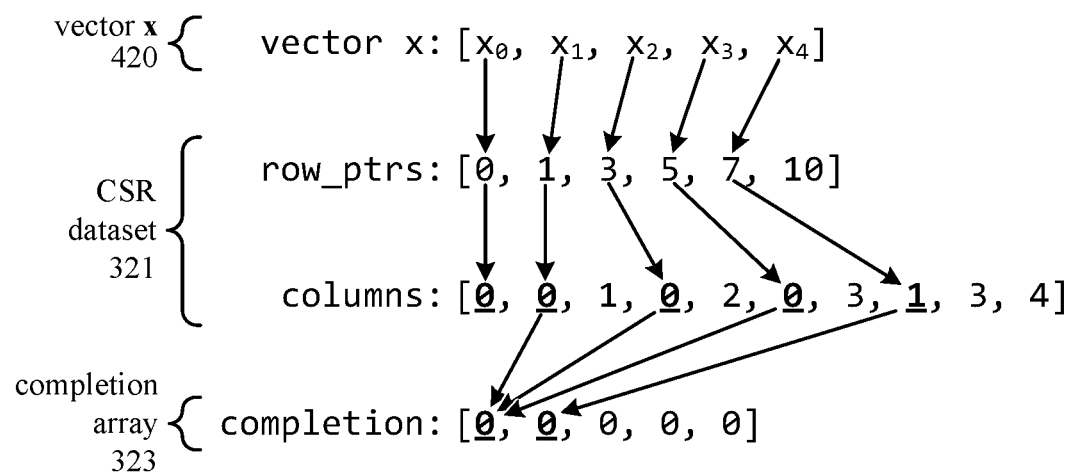
FIG. 5 illustrates elements in a CSR data set for identifying completion flags for each factor in a vector, according to an embodiment.

FIG. 5 illustrates the use of elements in the CSR data set arrays to determine which completion flags in the completion array 323 to monitor for each of the factors of vector x 420 that are being solved, according to an embodiment. In vector x 420, each of the factors x[0]-x[4] corresponds to one of the rows of matrix A 410, and thus corresponds in turn to one of the row pointer elements in the row pointers array. Accordingly, a thread being executed for solving one of the factors identifies a row pointer element that has the same index in the row pointer array as the factor to be solved. The row pointer element is used as an index to locate a column element in the column array, which identifies the first non-zero value in the corresponding row of matrix A 410. The thread uses the column element as an index to locate a completion flag in the completion array 323.

After identifying the completion flag, the thread executes a spin loop that repeatedly checks the completion flag until the completion flag is asserted. When the completion flag is asserted, the thread identifies the next completion flag to monitor by finding the next column element in the column array (e.g., by incrementing the index by one). The thread executes a spin loop to monitor the next completion flag. This process repeats until the next column element is equal to the index of the factor and thus corresponds to an element on the main diagonal of the matrix A 410. Each of the monitored completion flags indicates whether one of the antecedent factors (on which the solution of the factor depends) has been solved. Thus, when the main diagonal is reached, all of the antecedent factors for the row have been solved and the thread is able to solve its own factor.

When performing this process for factor x[0], the corresponding column element with a value of '0' already represents an element on the main diagonal. Therefore, the thread is already able to solve for x[0] without having to check any completion flag.

Figure 6:
FIG. 6 illustrates a timeline of events in a SpTS, according to an embodiment.

FIG. 6 illustrates a timeline of events in the SpTS, according to an embodiment. As illustrated in FIG. 6, each factor in the vector x is solved by one of the parallel threads 0-4. In one embodiment, the threads 0-4 are executed in one or more processing units (e.g., processing unit(s) 204), with each thread executed in one of the processing cores (e.g., one of cores 301-309). In alternative embodiments, each factor can be solved by multiple threads of a workgroup, or a workgroup can solve multiple factors. In the timeline of FIG. 6, time progresses from top to bottom. The right portion of the diagram shows the values of the completion flags in the completion array 323 at different times during the SpTS process.

At time 601, the completion array 323 is initialized with all completion flags set to '0' to indicate that no factors have yet been solved. Threads 0, 1, 2, 3, and 4 read product values y[0], y[1], y[2], y[3], and y[4] from vector y 430 and elements a, c, e, g, and j from the main diagonal of the matrix, respectively. The product values from vector y 430 and the main diagonal elements are values that are already known that will be used by each thread to solve its factor from vector x 420.

At time 602, each of the threads 1-3 (corresponding respectively to factors x[1]-x[3]) executes a spin loop to monitor the state of the completion flag at index 0 of the completion array (i.e., completion[0]), based on its determination as illustrated in FIG. 5. Thread 4 corresponding to factor x[4] executes a spin loop to monitor the state of completion[1] according to its determination as illustrated in FIG. 5. During this time 602, thread 0 has no dependencies (as previously discussed with reference to FIG. 5) and proceeds to solve for x[0]. Thread 0 divides y[0] by a and stores the result as x[0] in vector x 420. After storing the result, thread 0 asserts completion[0] by writing a non-zero value into completion[0].

At time 603, the completion flag at completion[0] is in an asserted state. For each of threads 1-3, the next column element in the column array is on the main diagonal (see FIG. 5); therefore, all of the antecedent factor values for threads 1-3 have been solved. Threads 1-3 exit their respective spin loops and proceed with solving their respective factors. Each thread 1-3 reads the newly calculated value for x[0] along with the matrix element (e.g., b, d, f) by which x[0] is multiplied in the equation Ax=y. At time 604, the threads 1-3 solve for the factors x[1]-x[3] based on x[0], the matrix element (b, d, f) and a product value (y[1]-y[3]) for the row, respectively. The threads 1-3 store the resulting calculated values of x[1]-x[3] in vector x 420.

After storing the calculated values, each thread 1-3 asserts the completion flag corresponding to its factor x[1]-x[3] to indicate that these factors are solved. Thus, threads 1, 2, and 3 assert completion[1], completion[2], and completion[3], respectively, by storing a non-zero value at these locations.

At time 605, completion[1] is in the asserted state; therefore, thread 4 stops spin looping on completion[1] and reads the newly calculated value for x[1], along with the matrix element h by which x[1] is multiplied in the equation Ax=y. At time 606, thread 4 identifies the next column in the matrix row that contains a non-zero element. In the columns array, the position columns[8] (adjacent to the initial position columns[7] for row 4) indicates that the next non-zero element in row 4 is an off-diagonal element in column 3. Therefore, thread 4 begins spin looping to monitor the state of the completion flag at completion[3], which corresponds to column 3.

At time 607, x[3] was previously solved and its completion flag asserted by thread 3 at time 603. Also, the next column in row 4 that has a non-zero value (as specified by columns[9]) is on the main diagonal of the matrix A 410. Therefore, the completion array 323 indicates that all of the antecedent factors have been solved. In response, thread 4 exits the spin loop and begins reading the values x[3] and i that it will use for calculating the value of its factor x[4]. At time 608, thread 4 calculates the value of factor x[4] based on the antecedent factors x[1] and x[2], matrix elements h, i, and j, and product value y[4]. Having solved for x[4], thread 4 asserts the completion flag at completion[4] by storing a non-zero value at completion[4].

In one embodiment, the threads 0-4 assert their respective completion flags in the completion array 323 by writing a '1' or other fixed number as the non-zero value. Alternatively, as illustrated in FIG. 6, the updating of the completion array 323 is used to generate level set information. Instead of simply asserting the completion flag with a '1' value, the asserting thread determines a value of the completion flag for its solved factor by incrementing a highest value among the completion flags of the antecedent factors. The thread then asserts the completion flag for the factor by storing the determined value of the completion flag in the completion array 323 at the position corresponding to the factor.

As an example, for each of these threads 1-3, the highest completion flag value for an antecedent factor (i.e., x[0]) is 1. Incrementing this results in a new completed flag value of '2'. The threads 1, 2, and 3 at time 604 thus assert the completion flags using the value '2' for their respective factors x[1], x[2], and x[3]. When thread 4 asserts a completion flag for solved factor x[4] at time 608, the highest completion flag among the completion flags corresponding to the antecedent factors x[1] and x[2] has a value of '2'. Therefore, thread 4 asserts the completion flag for x[4] using the incremented value of '3'.

At the end of the SpTS (time 609), the completion array 323 with all its completion flag elements asserted indicates a level set that can optionally be used to determine an order for subsequently solving factors of a new vector x. Continuing the previous example, the completion array including elements [1, 2, 2, 2, 3] indicates that x[0] is solved first in level 1, followed by x[1], x[2], and x[3] solved in parallel in level 2, and followed finally by solving x[4] in level 3. The completion array 323 is thus used to efficiently generate level set information that can be used in subsequent calculations for the same matrix A 410.

Figure 7:
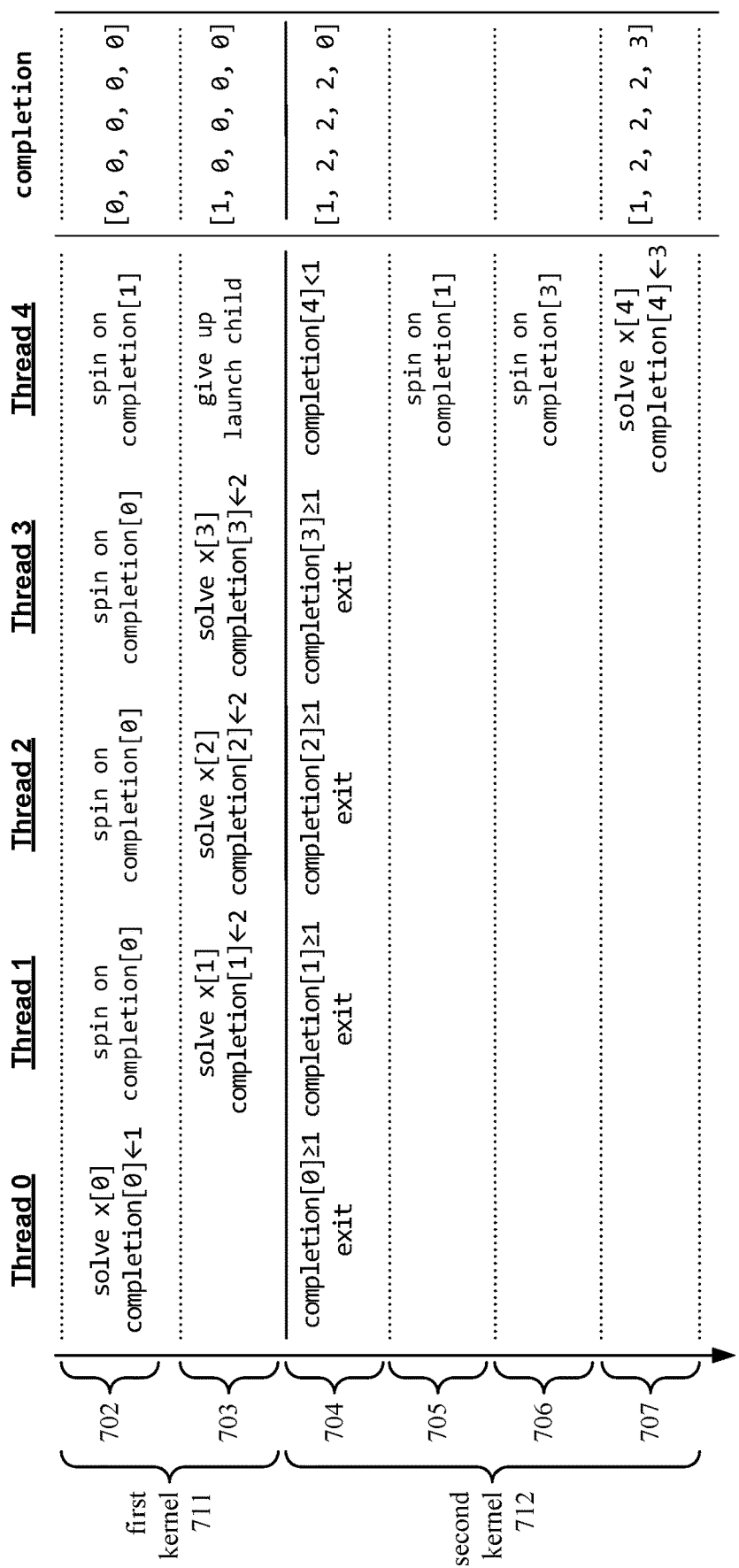
FIG. 7 illustrates a timeline of events in a SpTS, according to an embodiment.

FIG. 7 illustrates a timeline of events for performing an embodiment of a SpTS in which threads executing spin loops can time out and launch child kernels to reduce memory contention caused by the spin looping. Particularly in cases where the matrix A has a large number of rows and/or long chains of dependencies, spin looping to repeatedly check the completion status of a large number of corresponding factors can cause a significant amount of memory contention due to the repeated memory accesses for reading the completion array 323. The memory contention slows down threads that are attempting to solve their factors and make forward progress in the SpTS, further prolonging the time spent spin looping. To reduce the overall number of spin looping cycles, each thread performing a spin loop terminates the spin loop if the number of iterations or time spent spin looping exceeds a predetermined threshold. The spin looping is resumed in a corresponding thread of a child kernel after more progress in the SpTS has been made (i.e., more factors are solved).

As illustrated in FIG. 7, each of the threads 0-4 is executed in a first kernel 711 to solve for one of the factors x[0]-x[4] in the vector x 420. Each thread 0-4 begins by checking the completion array to determine whether its respective factor x[0]-x[4] has already been solved by a previous thread. If the factor has already been solved, the thread exits immediately. At time 702, the completion array 323 includes only '0' elements and thus indicates that none of the factors in vector x 420 have been solved. Accordingly, threads 1-3 execute spin loops to monitor complete[0] for the solving of x[0], while thread 4 executes a spin loop to monitor complete[1] for the solving of x[1]. Thread 0 solves for x[0] and asserts the associated completion flag at completion[0].

Each of the threads 1-3 continues executing its spin loop until the completion flag being monitored by the spin loop is asserted, or the number of iterations of the spin loop exceeds a predetermined limit. At time 703, the completion flag for x[0] at completion[0] is in the asserted state. Thus, the threads 1-3 begin solving their respective factors x[1]-x[3] before their spin loop iterations exceed the predetermined limit. However, thread 4 executes a spin loop on the completion flag for x[1] that exceeds the predetermined iteration limit before x[1] is solved. Thread 4 gives up by terminating its spin loop and checks a global "child_launched" variable that indicates whether a child kernel has already been launched by any other thread. If the "child_launched" variable is asserted, then a child kernel has already been launched by another thread, and thread 4 exits without launching a child kernel. If the "child_launched" variable is not asserted, then no child kernel has previously been launched and thread 4 launches the second kernel 712, which is enqueued to start after the first kernel 711 completes (i.e., when all other threads in the kernel 711 are completed). In connection with launching kernel 712, thread 4 asserts the "child_launched" variable to prevent other threads in the first kernel 711 from attempting to launch a child kernel in this manner. Thread 4 then exits. By this mechanism, threads that execute too many iterations or spend too much time spin looping stop accessing the memory system temporarily until more progress is made.

At the end of time 703, when all of the parallel threads 0-4 have completed, the first kernel 711 exits. At time 704, the second kernel 712 is launched, and parallel threads 0-4 are invoked again for the same factors x[0]-x[4], respectively. The global "child_launched" variable is initialized to the deasserted state in connection with the launching of the child kernel 712. The threads 0-4 check the completion flags for their respective factors x[0]-x[4]. Since the completion array 323 indicates that factors x[0]-x[3] have already been solved, threads 0-3 exit.

However, the completion flag at complete[4] is deasserted and indicates that factor x[4] has not been solved. Thread 4 determines whether the antecedent factors x[1] and x[3] have been solved by executing a spin loop to check the completion flags for x[1] (at completion[1]) and for x[3] (at completion[3]). At time 705, thread 4 determines that x[1] has already been solved based on its completion flag at completion[1]. At time 706, thread 4 determines that x[3] has already been solved based on its completion flag at completion[3]. Since all of the antecedent factors on which the solution of factor x[4] depends have been solved, thread 4 proceeds to solve x[4] at time 707. Once all of the factors x[0]-x[4] have been solved, no more child kernels will be launched and the SpTS is completed.

Figure 8:
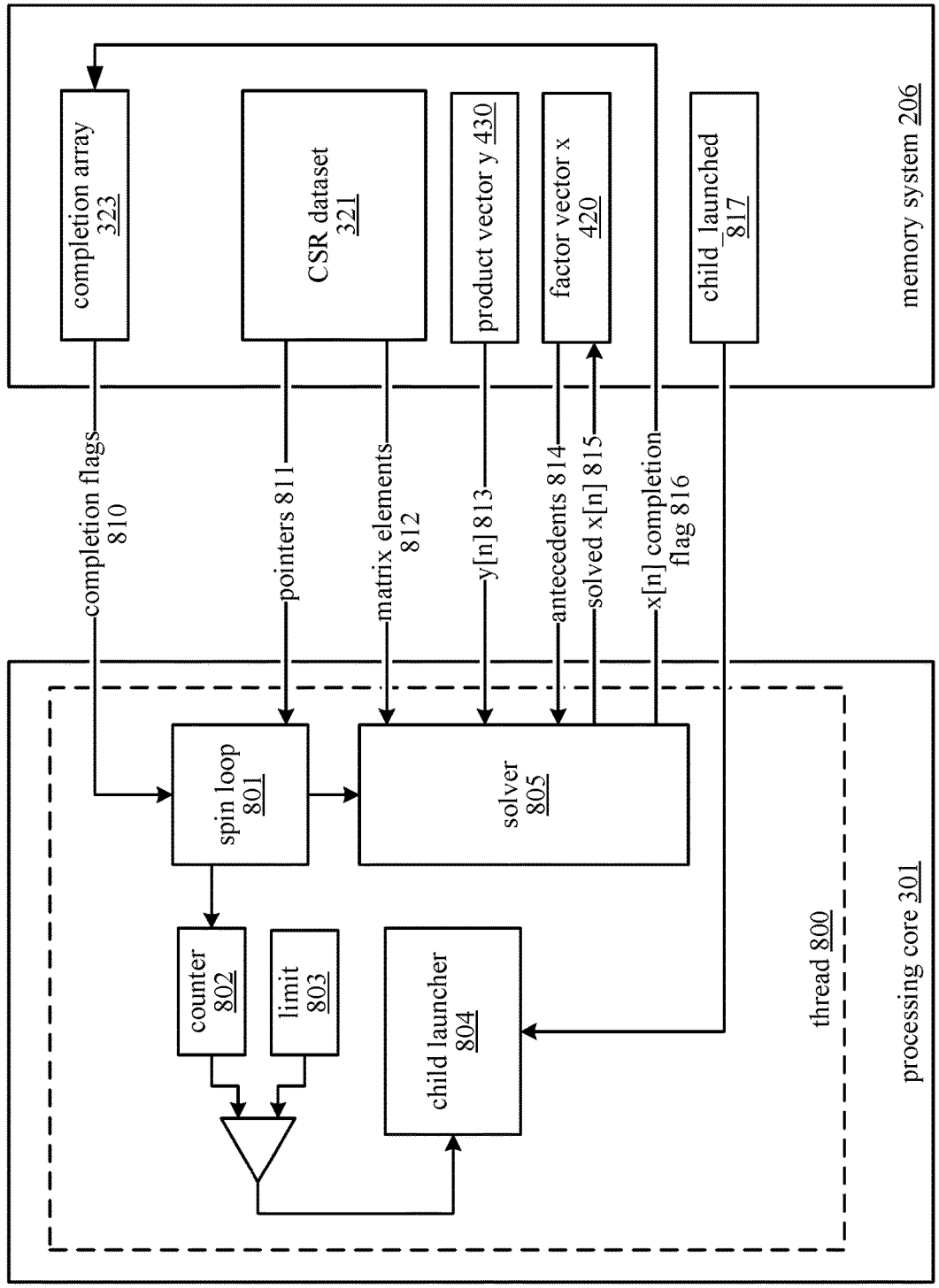
FIG. 8 is a block diagram illustrating modules for performing a SpTS in a processing core, according to an embodiment.

FIG. 8 illustrates a block diagram of modules in a processing core 301 for executing a high-performance SpTS on a CSR dataset 321, according to an embodiment. In one embodiment, the modules 801-805 in the processing core 301 are implemented using hardened circuit modules; in alternative embodiments, the modules 801-805 are implemented using programmable logic circuits (e.g., when processing core 301 is implemented using an FPGA or other programmable device), software modules, or a combination of hardware, software, programmable logic, etc. In one embodiment, the modules 801-805 perform the operations executed in a thread 800 for solving a factor x[n], which represents the nth element in the vector x. In one embodiment, thread 800 functions in a similar manner as threads 0-4 as described with reference to FIG. 6 or FIG. 7.

The spin loop module 801 reads pointers 811 (from the row pointers array and columns array) to determine the appropriate completion flags to monitor in the completion array 323, as previously described with reference to FIG. 5, and executes a spin loop to repeatedly check the completion flags 810 from the completion array 323. The spin loop module 801 thus determines the availability of any antecedent factors on which the factor x[n] to be solved depends.

In one embodiment, the thread 800 reduces memory contention by exiting and launching a child kernel when the spin looping has taken too much time or has been executed for too many iterations. Each iteration of the spin loop executed by module 801 is counted by the counter 802. The number of iterations (or alternatively, the time spent spin looping) is compared to a predetermined limit 803 and, when the number of iterations of the spin loop (or time spent spin looping) exceeds the limit 803, the child launcher 804 checks the "child_launched" variable 817. If the "child_launched" variable 817 indicates that a child kernel has not been launched by another thread, the child launcher 804 launches a child kernel 712 that is enqueued to start after all the threads in the current kernel 711 are completed. The thread 800 thus ceases spin looping in response to exceeding the limit 803, then restarts spin looping in the child kernel 712 after more progress has been made in the SpTS (i.e., more factors have been solved).

The solver module 805 calculates a value for the factor x[n] in response to the spin loop module 801 determining that all of the antecedent factors for x[n] have been solved, as indicated by their associated completion flags in the completion array 323. The solver 805 reads the matrix elements 812 in a row corresponding to x[n] from the CSR dataset 321, a product value y[n] from the product vector y 430 corresponding to x[n], and the solved antecedent factors 814 from the vector x 420. The solver 805 calculates the value of its factor x[n] by substituting the antecedent factors 814, product y[n] 813, and matrix elements 812 into an equation for the row as defined by Ax=y, then algebraically solving for the factor x[n].

The solver 805 stores the solved value 815 of x[n] in the factor vector x 420, where it is made available for solving factors in other threads. Solver 805 also determines a non-zero value for the completion flag 816 for x[n] and asserts the completion flag in the completion array 323 by storing the value in the completion array 323. In one embodiment, the solver 805 determines a value of the completion flag by incrementing a highest value among the completion flags of the antecedent factors in order to calculate a level for the factor x[n]. Alternatively, the solver 805 uses '1' or another fixed value for the completion flag.

Figure 9A:
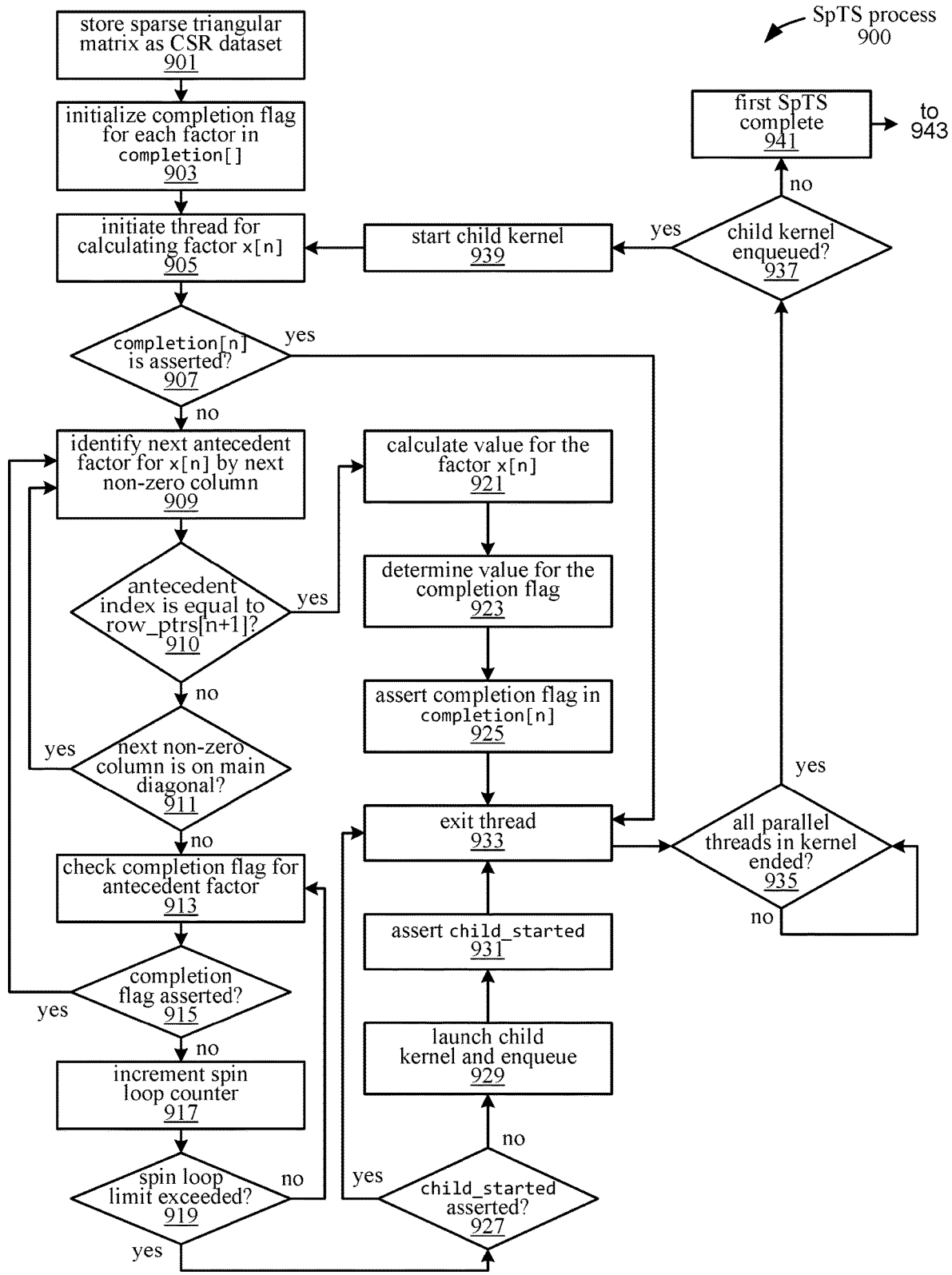
FIGS. 9A and 9B are flow diagrams illustrating a process for performing a SpTS, according to an embodiment.
Figure 9B:
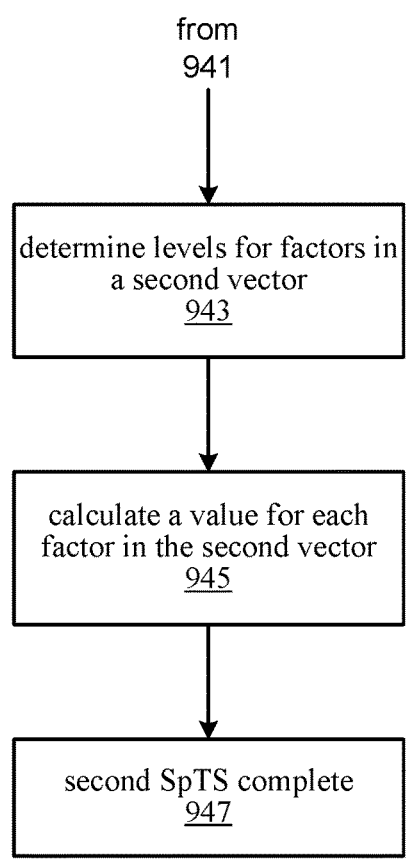

FIGS. 9A and 9B illustrate a process 900 for performing a high-performance SpTS on a sparse triangular matrix stored in a CSR format. The operations of process 900 are performed by components of the computing system 100 such as memory system 206, modules 801-805 in the processing core 301, etc.

At block 901, the memory system 206 stores a sparse triangular matrix A 410 as a CSR dataset 321. Within the CSR dataset 321, a values array stores the elements of the matrix A 410, a columns array identifies a column of the matrix A 410 for each of the elements stored in the values array, and a row pointers array identifies the elements in each row of the matrix A 410. These arrays in the CSR dataset 321 are illustrated in FIG. 4C.

The memory system 206 also stores a completion array 323 (completion[ ]) that includes completion flags for each of the factors x[0]-x[4] in the vector x 420. At block 903, each of the completion flags in the completion array 323 is initialized to '0', indicating that none of the factors have been solved. At block 905, multiple parallel threads are initiated, with each thread calculating one of the factors in the vector x 420. One of the parallel threads 800 is started for calculating the value of a factor x[n], with n generally representing the index of the factor x[n] in the vector x 420.

At block 907, the thread 800 determines whether the factor x[n] has already been solved by a prior process by reading the completion flag at completion[n]. If completion [n] is a non-zero value (i.e., asserted), the thread 800 exits at block 933 since x[n] is already solved. If completion[n] is zero (i.e., deasserted), the process 900 continues at block 909.

The value of x[n] is data dependent on each of a set of one or more antecedent factors in the vector x 420; that is, the values of the antecedent factors are used to calculate the value of x[n]. Thus at block 909, the spin loop module 801 identifies a next antecedent factor for monitoring based on the row pointer array and the column array in the CSR dataset 321. A row pointer having the same index n as the factor x[n] is used as an index identifying a position in the columns array. The identified position in the columns array identifies the column of a non-zero element in the row n of the matrix A 410 corresponding to the factor x[n]. As an example with reference to FIG. 5, for the factor x[4], row_ptrs[4] has a value of '7', and columns[7] has a value of '1'. This indicates that in row 4 of the matrix A 410, a non-zero element is in column 1. As shown in FIG. 4A, this non-zero element is 'h'.

At block 910, if the index of the identified position in the columns array is not equal to row_ptrs[n+1], then not all of the columns containing non-zero elements in row n have been traversed, and spin looping has not been performed for all of the antecedent factors. Continuing the previous example for row 4, row_ptrs[4+1] is '10'. The current index in the columns array for the identified non-zero element 'h' corresponding to the antecedent factor x[1] is '7'. Since these values are not equal, not all of the columns for row 4 have been traversed, and the process 900 continues at block 911.

At block 911, the spin loop module 801 determines whether the identified non-zero element is located on the main diagonal of the matrix A 410. In one embodiment, the non-zero element is on the main diagonal if its column number is equal to the index of the factor (i.e., 'n'). If the element is located on the main diagonal, the process 900 returns to block 909 without performing any spin looping. The factor corresponding to the element on the main diagonal is the factor x[n] to be solved by the thread 800; accordingly, spin looping is not performed to monitor its completion flag. The process 900 instead continues to the next antecedent factor at block 910. At block 911, if the element is located off-diagonal (not on the main diagonal), then the element corresponds to an antecedent factor and the process 900 continues at block 913.

At block 913, the spin loop module 801 checks the completion flag for the first antecedent factor by reading the completion flag 810 from the completion array 323 in memory 206. Continuing the previous example with reference to FIG. 5, the identified element in the columns array stores an index of the completion flag for an antecedent factor in the completion array 323. Thus, the spin loop module 801 reads the completion flag at completion[1], which indicates whether the antecedent factor x[1] has been solved. At block 915, if the completion flag is not asserted, the antecedent factor has not been solved and the process 900 continues at block 917.

At block 917, the spin loop module 801 increments a spin loop counter 802 that counts the number of iterations of the spin loop that have been performed. The counted number of iterations is compared to a limit 803 and, at block 919, if the number of iterations counted does not exceed the limit 803, the process 900 continues back to block 913. Thus, the process 900 loops through blocks 913-919 to perform the spin loop for monitoring the completion flag of the first antecedent factor until the completion flag is asserted or until the limit 803 is exceeded.

During the spin loop, if the completion flag is asserted, the process proceeds from block 915 to block 909. At block 909, the spin loop module 801 identifies the next antecedent factor on which the solution to the factor x[n] depends. The columns array identifies the non-zero elements in row n; accordingly, any next non-zero element in the row would be indicated in the columns array adjacent to the most recently identified non-zero column. The index of the most recently identified column is thus incremented by one. Continuing the previous example with reference to FIG. 5, the most recently identified column in row 4 that stores a non-zero value is indicated at columns[7]; thus, the next non-zero element in row 4 is indicated at columns[7+1], or columns [8]. This position in the columns array indicates that row 4 has a non-zero value at column 3. As shown in FIG. 4A, this value is 'i'.

Column 3 of row 4 has an index of '8' in the columns array, which is not equal to row_ptrs[4+1]; therefore, the process 900 continues from block 910 to 911. Column 3 of row 4 is an off-diagonal element in the matrix A 410. Therefore, from block 911, the process 900 continues at block 913. At block 913, the spin loop module 801 reads the completion flag specified at the current position in the columns array. Continuing the previous example, columns [8] specifies column 3. Therefore, the spin loop is performed for monitoring the completion flag at completion[3], which indicates whether x[3] is solved. Blocks 909-919 are thus repeated to execute the spin loops for monitoring the completion flags of multiple antecedent factors (e.g., x[1] and x[3]) for the factor x[n] in turn.

At block 910, if the index of the non-zero element in the columns array is equal to row_ptrs[n+1], then all of the columns containing non-zero elements in row n have been traversed. This means that the spin looping process has detected asserted completion flags for all of the antecedent factors. Continuing the previous example, row 4 includes non-zero elements in columns 1, 3, and 4. The last column '4' has an index of '9' in the columns array. For row 4, row_ptrs[n+1] is equal to '10'. Thus, by the time the index for the columns array is incremented to '10', all of the columns having non-zero elements (having indexes from '7' to '9') have been traversed by the spin loop module 801; that is, the spin looping process has determined that the completion flags for all of the antecedent factors x[1] and x[3] have been asserted. At this time, all of the antecedent factors have been solved; thus, at block 921, the solver 805 calculates the value of the factor x[n] based on the solved antecedent factors 814, the elements 812 in row n of matrix A 410 corresponding to x[n], and a product value y[n] 813 corresponding to x[n]. The calculated value for x[n] 815 is written to the vector x 420 in memory system 206. Continuing the previous example where n is equal to '4', the solver 805 calculates x[4] from (y[4]−hx[1]−ix[3])/j, then writes the result to vector x 420.

At block 923, the solver 805 calculates a non-zero value for asserting the completion flag of x[n]. The solver 805 increments the highest valued completion flag among the completion flags of the antecedent factors on which the solving of x[n] depends. For x[4], the completion flags for antecedent factors x[1] and x[3] are '2' and '2', respectively, as shown in FIG. 6 at time 605. Since the highest valued completion flag is '2', the completion flag for x[4] is 3. At block 925, the solver 805 writes the completion flag 816 at a position corresponding to the factor in the completion array 323. In one embodiment, the completion flag has the same index n in the completion array as the factor x[n] in vector x 420 (e.g., completion[n] corresponds to factor x[n]). The completion flag indicates that x[n] is solved; thus, the thread exits at block 933.

At block 919, if the number of iterations of the spin loop as counted by the counter 802 exceeds the limit 803, the process 900 continues at block 927. At block 927, the child launcher 804 checks the child_started global variable 817, which indicates whether a child kernel of the current kernel has previously been launched. If the child_started variable 817 is asserted, the thread exits at block 933 without launching a child kernel and the spin loop is thus terminated. At block 927, if the child_started variable 817 is deasserted, a child kernel has not previously been launched, and the process 900 continues at block 929. At block 929, the child launcher 804 launches a child kernel and enqueues the child kernel to start after completion of the current kernel. The child kernel is thus enqueued to start a new set of parallel threads after all of the parallel threads in the currently executing kernel have ended.

At block 931, the child launcher 804 asserts the child started flag in connection with launching and enqueueing the child kernel and its parallel threads. This prevents other currently executing threads that exceed the limit 803 for spin loops from launching and enqueuing another child kernel. If a child kernel is already enqueued, any threads in the current kernel that have terminated due to the spin loop limit 803 will be continued in a corresponding thread in the same child kernel. At block 933, the thread exits.

At block 935, the processing core 301 waits for the remaining parallel threads in the current kernel to end. Each of the parallel threads either finishes solving its factor, or terminates due to exceeding the spin loop limit 803. When all of the threads have ended, the kernel has completed and the process 900 continues at block 937.

At block 937, if a child kernel has been enqueued (i.e., at block 929), the process continues at block 939. At block 939, the enqueued child kernel is started. The child kernel starts a thread for each of the factors x[n] in the vector x 420. Threads for solving factors that were already solved in prior threads (as indicated by the completion array) are terminated via blocks 907 and 933. The remaining unsolved factors are solved as previously described. The new threads execute spin loops (i.e., blocks 909-919) to determine when all of the antecedent factors for their respective factors are available, and solve their factors after the antecedent factors have been solved. Each child kernel, via one of its threads exceeding the spin loop limit 803, can also launch and enqueue its own child kernel via blocks 919 and 927-933 until all of the factors in vector x 420 are solved and the entire SpTS is complete.

When all of the factors in vector x 420 are solved, all of the threads exit at block 933 from either block 907 or block 925, and no child kernel is enqueued. Thus, from block 937, the process 900 continues at block 941, where the SpTS is completed.

In one embodiment, the blocks 901-941 represent operations for performing a first SpTS of the matrix A 410, while blocks 943-947 represent operations for performing a second SpTS of the matrix A 410, as illustrated in FIG. 9B. For the second SpTS, the completion array generated from performing the first SpTS is used when solving a second vector x' in the equation Ax'=y', where A is the same matrix A 410 from the first SpTS, x' is a second vector of unknown factors that is different from vector x 420, and y' is a second vector of known product values that is different from vector y 430.

At block 943, a processing unit (e.g., one of the processing units 204) determines levels for the factors to be solved in the vector x'. The level for each factor in vector x' is indicated by a corresponding completion flag having the same index as the factor in the previously generated completion array. For example, when the previously generated completion array includes the completion flags [1, 2, 2, 2, 3], level 1 includes x/[0], level 2 includes x/[1], x'[2], and x'[3], and level 3 includes x'[4]. Factors in the same level are solvable in parallel.

At block 945, the processing unit calculates a value for each of the factors x' [n] in the vector x' in an order corresponding to the determined levels, with factors in lower-numbered levels being solved prior to factors in higher-numbered levels, and factors in the same level being solved in parallel. Each factor x'[n] is solved based on its antecedent factors, the elements in a corresponding row of the matrix A 410, and a corresponding product value y' [n]. If the factors x' [n] are solved in order according to the levels, each factor will be solved after its antecedent factors have already been solved. After all of the factors are solved, the second SpTS is complete at block 947.

The process 900 thus allows a parallel computing system (e.g., computing system 100) to perform a SpTS on a matrix stored in the CSR format without a costly conversion of the CSR dataset to a different format (such as CSC), and without performing any costly dependency analysis. Accordingly, a parallel computing system employing this approach consumes less power, utilizes fewer computing resources, and calculates the solution in less time compared to other approaches for achieving the same results.

A method includes storing a sparse triangular matrix as a compressed sparse row (CSR) dataset and, for each factor of a plurality of factors in a first vector, calculating a value of the factor. Calculating the value of the factor includes identifying for the factor a set of one or more antecedent factors in the first vector, where the value of the factor is dependent on each of the one or more antecedent factors; in response to a completion array indicating that all of the one or more antecedent factor values are solved, calculating the value of the factor based on one or more elements in a row of the matrix, and a product value corresponding to the row; and in the completion array, asserting a first completion flag for the factor indicating that the factor is solved.

The method further includes storing elements of the matrix in a values array of the CSR dataset, in a columns array of the CSR dataset, identifying a column of the matrix for each of the elements stored in the values array, and in a row pointers array of the CSR dataset, identifying the elements in each row of the matrix.

The method further includes, for each factor of the plurality of factors, initiating a thread for calculating the value of the factor, where the thread is one of a plurality of threads executed in parallel.

The method further includes, for each thread of the plurality of threads, counting a number of iterations of a spin loop executed in the thread for monitoring a second completion flag in the completion array, where the second completion flag is associated with one of the antecedent factors, and in response to the number of iterations exceeding a limit, terminating the spin loop, enqueueing a new thread for execution when all of the plurality of parallel processing threads have completed, and monitoring the completion flag in the new thread.

The method further includes checking a child started flag, where the enqueueing of the new thread is performed when the child started flag is deasserted, and asserting the child started flag in connection with the enqueueing of the new thread.

The method further includes, for each factor of the plurality of factors, executing a first spin loop to monitor a first completion flag in the completion array, where the first completion flag is specified at a first position in a column array of the CSR dataset, and where the first position in the column array is indicated by a row pointer corresponding to the factor, and executing a second spin loop to monitor a second completion flag in the completion array in response to determining that the first completion flag is asserted and that a second position in the column array corresponds to an off-diagonal element of the sparse triangular matrix, where the second completion flag is specified at the second position in the column array.

In the method, a position of the row pointer in a row pointer array corresponds to a position of the factor in the vector, the row pointer is an index of the first position in the column array, and the first position of the column array stores an index of the completion flag in the completion array.

The method further includes, for each factor of the plurality of factors, storing a completion flag for each of the antecedent factors, determining a value of the completion flag for the factor by incrementing a highest valued completion flag among the completion flags of the antecedent factors, and asserting the completion flag for the factor by storing the determined value of the completion flag for the factor in the completion array at a position corresponding to the factor.

The method further includes, for each factor of a plurality of factors in a second vector, determining a level for the factor based on a value of the completion flag corresponding to the factor in the completion array, and calculating a value for each of the factors in the second vector in an order according to the determined levels, where values for at least two of the plurality of factors in the same level are calculated in parallel.

In the method, the CSR dataset is stored in a memory system and, for each factor of the plurality of factors, the value of the factor is calculated in a solver circuit coupled with the memory system.

The method further includes reading the first completion flag from the completion array using a spin loop circuit, where the completion array is stored in a memory system and asserting the first completion flag in the completion array is performed by a solver circuit coupled with the spin loop circuit and with the memory system.

A computing device includes a memory for storing a sparse triangular matrix as a compressed sparse row (CSR) dataset and a processing unit coupled with the memory. The processing unit is for calculating, for each factor of a plurality of factors in a first vector, a value of the factor by identifying for the factor a set of one or more antecedent factors in the first vector, where the value of the factor is dependent on each of the one or more antecedent factors, in response to a completion array indicating that all of the one or more antecedent factor values are solved, calculating the value of the factor based on one or more elements in a row of the matrix and a product value corresponding to the row, and in the completion array, asserting a completion flag for the factor indicating that the factor is solved.

In the computing device, the CSR dataset further includes a values array for storing elements of the matrix, a columns array for identifying a column of the matrix for each of the elements stored in the values array, and a row pointers array for identifying elements in each row of the matrix.

In the computing device, the processing unit includes a plurality of processing cores each for executing a thread of a plurality of parallel threads for calculating the value of one of the factors in the vector.

In the computing device, each of the plurality of processing cores is further for monitoring a completion flag in the completion array by executing a spin loop in the thread, and in response to a number of iterations of the spin loop exceeding a predetermined limit, terminate the spin loop, and when all of the plurality of parallel processing threads have completed, execute a new thread for monitoring the completion flag.

In the computing device, the processing unit includes a plurality of processing cores each for executing a first spin loop to monitor a first completion flag in the completion array, where the first completion flag is specified at a first position in a column array of the CSR dataset, where the first position in the column array is indicated by a row pointer corresponding to one of the plurality of factors in a first vector, and execute a second spin loop to monitor a second completion flag in the completion array in response to determining that the first completion flag is asserted and that a second position in the column array corresponds to an off-diagonal element of the sparse triangular matrix, where the second completion flag is specified at the second position in the column array.

The computing device further includes a completion array in the memory, where the completion array is for storing a completion flag for each of the plurality of factors, where the processing unit is further for determining, for each factor of the plurality of factors, a value of the completion flag for the factor by incrementing a highest value among the completion flags of the antecedent factors, and assert the completion flag for the factor by storing the determined value of the completion flag for the factor in the completion array at a position corresponding to the factor.

In the computing device, the processing unit is further for determining, for each factor of a plurality of factors in a second vector, a level for the factor based on a value of the completion flag corresponding to the factor in the completion array, and calculate a value for each of the factors in the second vector in an order according to the determined levels, where values for at least two of the plurality of factors in the same level are calculated in parallel.

A computing system includes a memory system for storing a sparse triangular matrix as a compressed sparse row (CSR) dataset and a set of one or more processing units coupled with the memory system. Each processing unit in the set of processing units is for calculating, for each factor of a plurality of factors in a first vector, a value of the factor by identifying for the factor a set of one or more antecedent factors in the first vector, where the value of the factor is dependent on each of the one or more antecedent factors, in response to a completion array indicating that all of the one or more antecedent factor values are solved, calculating the value of the factor based on one or more elements in a row of the matrix and a product value corresponding to the row, and in the completion array, asserting a completion flag for the factor indicating that the factor is solved.

In the computing system, each processing unit in the set of processing units is further for executing at least one of a plurality of parallel threads, where each of the plurality of parallel threads calculates a value for one of the plurality of factors.

In the computing system, each processing unit in the set of processing units further includes a plurality of processing cores on a single integrated circuit die, where each of the plurality of processing cores is for executing one of the plurality of parallel threads.

In the computing system, each processing unit in the set of processing units is a graphics processing unit (GPU) on a separate integrated circuit die from other processing units in the set of processing units.

As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a non-transitory computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The non-transitory computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Generally, a data structure representing the computing device 101 and/or portions thereof carried on the computer-readable storage medium may be a database or other data structure which can be read by a program and used, directly or indirectly, to fabricate the hardware including the computing device 101. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist including a list of gates from a synthesis library. The netlist includes a set of gates which also represent the functionality of the hardware including the computing device 101. The netlist may then be placed and routed to produce a data set describing geometric shapes to be applied to masks. The masks may then be used in various semiconductor fabrication steps to produce a semiconductor circuit or circuits corresponding to the computing device 101. Alternatively, the database on the computer-readable storage medium may be the netlist (with or without the synthesis library) or the data set, as desired, or Graphic Data System (GDS) II data.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be in an intermittent and/or alternating manner.

In the foregoing specification, the embodiments have been described with reference to specific exemplary embodiments thereof. It will, however, be evident that various modifications and changes may be made thereto without departing from the broader scope of the embodiments as set forth in the appended claims. The specification and drawings are, accordingly, to be regarded in an illustrative sense rather than a restrictive sense.

What is claimed is:

1. A method, comprising:
   in a memory device, storing a sparse triangular matrix as a compressed sparse row (CSR) dataset;
   in a processing unit comprising a plurality of processing cores, calculating a value for each of a subset of factors in a first vector by, for each factor in the subset of factors in the first vector, calculating the value of the factor by:
      identifying for the factor a set of one or more antecedent factors in the first vector, wherein the value of the factor is dependent on each of the one or more antecedent factors;
      in response to a completion array indicating that all of the one or more antecedent factor values are solved, initiating a thread in one of the plurality of processing cores for calculating the value of the factor, wherein the thread is executed in the one of the plurality of processing cores based on
         one or more elements in a row of the matrix, and
         a product value corresponding to the one or more antecedent factor values, the value of the factor, and the one or more elements in the row; and
      in the completion array, asserting a completion flag for the factor indicating that the factor is solved.

2. The method of claim 1, wherein storing the sparse triangular matrix as the CSR dataset further comprises:
   storing elements of the matrix in a values array of the CSR dataset;
   in a columns array of the CSR dataset, identifying a column of the matrix for each of the elements stored in the values array; and
   in a row pointers array of the CSR dataset, identifying the elements in each row of the matrix.

3. The method of claim 1, wherein for each factor of the subset of factors:
   the thread is one of a plurality of parallel threads executed in parallel with each other, wherein each of the plurality of parallel threads is for calculating one of the plurality of factors.

4. The method of claim 3, further comprising, for each thread of the plurality of threads:
   counting a number of iterations of a spin loop executed in the thread for monitoring a second completion flag in the completion array, wherein the second completion flag is associated with one of the antecedent factors; and
   in response to the number of iterations exceeding a limit, terminating the spin loop,
      enqueueing a child kernel for execution when all of the plurality of parallel processing threads have completed, and
      monitoring the second completion flag in a new thread in the child kernel.

5. The method of claim 4, further comprising:
   checking a child started flag, wherein the enqueueing of the child kernel is performed when the child started flag is deasserted; and
   asserting the child started flag in connection with the enqueueing of the child kernel.

6. The method of claim 1, further comprising, for each factor of the subset of factors:
   executing a first spin loop to monitor a first completion flag in the completion array, wherein the first completion flag is specified at a first position in a column array of the CSR dataset, and wherein the first position in the column array is indicated by a row pointer corresponding to the factor; and
   executing a second spin loop to monitor a second completion flag in the completion array in response to determining that the first completion flag is asserted and that a second position in the column array corresponds to an off-diagonal element of the sparse triangular matrix, wherein the second completion flag is specified at the second position in the column array.

7. The method of claim 6, wherein for each factor of the subset of factors:
   a position of the row pointer in a row pointer array corresponds to a position of the factor in the vector;
   the row pointer is an index of the first position in the column array; and
   the first position of the column array stores an index of the completion flag of the factor in the completion array.

8. The method of claim 1, further comprising, for each factor of the subset of factors:
   storing a completion flag for each of the antecedent factors;
   determining a value of the completion flag for the factor by incrementing a highest valued completion flag among the completion flags of the antecedent factors; and
   asserting the completion flag for the factor by storing the determined value of the completion flag for the factor in the completion array at a position corresponding to the factor.

9. The method of claim 8, further comprising:
   for each factor of a plurality of factors in a second vector, determining a level for the factor based on a value of the completion flag corresponding to the factor in the completion array; and
   calculating a value for each of the factors in the second vector in an order according to the determined levels, wherein values for at least two of the plurality of factors in the same level are calculated in parallel.

10. The method of claim 1, wherein:
    the CSR dataset is stored in a memory system, and
    for each factor of the subset of factors, the value of the factor is calculated in a solver circuit coupled with the memory system.

11. The method of claim 1, further comprising:
    creating the completion array; and
    reading the completion flag from the completion array using a spin loop circuit, wherein:
    the completion array is stored in a memory system, and
    asserting the completion flag in the completion array is performed by a solver circuit coupled with the spin loop circuit and with the memory system.

12. A computing device, comprising:
    a memory configured to store a sparse triangular matrix as a compressed sparse row (CSR) dataset; and a processing unit comprising a plurality of processing cores, wherein the processing core is coupled with the memory and is configured to:
for each factor of a subset of factors in a first vector, calculate a value of the factor by:
identifying for the factor a set of one or more antecedent factors in the first vector, wherein the value of the factor is dependent on each of the one or more antecedent factors;
in response to a completion array indicating that all of the one or more antecedent factor values are solved, initiating a thread in one of the plurality of processing cores for calculating the value of the factor, wherein the thread is executed in the one of the plurality of processing cores based on
one or more elements in a row of the matrix, and
a product value corresponding to the antecedent factor values, the value of the factor, and the one or more elements in the row; and
in the completion array, asserting a completion flag for the factor indicating that the factor is solved.

13. The computing device of claim 12, wherein the CSR dataset further comprises:
a values array configured to store elements of the matrix;
a columns array configured to identify a column of the matrix for each of the elements stored in the values array; and
a row pointers array configured to identify elements in each row of the matrix.

14. The computing device of claim 12, wherein the processing unit comprises a plurality of processing cores each configured to:
execute a thread of a plurality of parallel threads for calculating the value of one of the factors in the vector.

15. The computing device of claim 14, wherein each of the plurality of processing cores is further configured to:
monitor the completion flag in the completion array by executing a spin loop in the thread; and
in response to a number of iterations of the spin loop exceeding a predetermined limit,
terminate the spin loop, and
when all of the plurality of parallel processing threads have completed, execute a new thread for monitoring the completion flag.

16. The computing device of claim 12, wherein the processing unit comprises a plurality of processing cores each configured to:
execute a first spin loop to monitor a first completion flag in the completion array, wherein the first completion flag is specified at a first position in a column array of the CSR dataset, wherein the first position in the column array is indicated by a row pointer corresponding to one of the subset of factors in the first vector; and
execute a second spin loop to monitor a second completion flag in the completion array in response to determining that the first completion flag is asserted and that a second position in the column array corresponds to an off-diagonal element of the sparse triangular matrix, wherein the second completion flag is specified at the second position in the column array.

17. The computing device of claim 12, further comprising:
a completion array in the memory, wherein the completion array is configured to store a completion flag for each of the subset of factors,
wherein the processing unit is further configured to, for each factor of the subset of factors:
determine a value of the completion flag for the factor by incrementing a highest value among the completion flags of the antecedent factors, and
assert the completion flag for the factor by storing the determined value of the completion flag for the factor in the completion array at a position corresponding to the factor.

18. The computing device of claim 17, wherein the processing unit is further configured to:
for each factor of a plurality of factors in a second vector, determine a level for the factor based on a value of the completion flag corresponding to the factor in the completion array; and
calculate a value for each of the factors in the second vector in an order according to the determined levels, wherein values for at least two of the plurality of factors in the same level are calculated in parallel.

19. A computing system, comprising:
a memory system configured to store a sparse triangular matrix as a compressed sparse row (CSR) dataset;
a set of one or more processing units coupled with the memory system, wherein each processing unit in the set of processing units comprises a plurality of processing cores and is configured to:
for each factor of a subset of factors in a first vector, calculate a value of the factor by:
identifying for the factor a set of one or more antecedent factors in the first vector, wherein the value of the factor is dependent on each of the one or more antecedent factors;
in response to a completion array indicating that all of the one or more antecedent factor values are solved, initiating a thread in one of the plurality of processing cores for calculating the value of the factor, wherein the thread is executed in the one of the plurality of processing cores based on
one or more elements in a row of the matrix, and
a product value corresponding to the antecedent factor values, the value of the factor, and the one or more elements in the row; and
in the completion array, asserting a completion flag for the factor indicating that the factor is solved.

20. The computing system of claim 19, wherein each processing unit in the set of processing units is further configured to:
execute at least one of a plurality of parallel threads, wherein each of the plurality of parallel threads calculates a value for one of the subset of factors.

21. The computing system of claim 20, wherein each processing unit in the set of processing units further comprises a plurality of processing cores on a single integrated circuit die, wherein each of the plurality of processing cores is configured to execute one of the plurality of parallel threads.

22. The computing system of claim 19, wherein each processing unit in the set of processing units is a graphics processing unit (GPU) on a separate integrated circuit die from other processing units in the set of processing units.

* * * * *